(12) United States Patent
Ybarra (10) Patent No.: US 8,375,225 B1
(45) Date of Patent: Feb. 12, 2013

(54) MEMORY PROTECTION

(75) Inventor: Danny O. Ybarra, Mission Viejo, CA (US)

(73) Assignee: Western Digital Technologies, Inc., Irvine, CA (US)

(*) Notice: Subject to any disclaimer, the term of this patent is extended or adjusted under 35 U.S.C. 154(b) by 459 days.

(21) Appl. No.: 12/636,257

(22) Filed: Dec. 11, 2009

(51) Int. Cl.
*G06F 21/00* (2006.01)

(52) U.S. Cl. ........ 713/193; 713/150; 713/151; 713/152; 713/153; 713/154; 380/44; 380/45; 380/46; 380/47

(58) Field of Classification Search ............... None
See application file for complete search history.

(56) References Cited

U.S. PATENT DOCUMENTS

| | | | |
|---|---|---|---|
| 3,657,699 A * | 4/1972 | Rocher et al. ............... 380/265 |
| 4,591,704 A | 5/1986 | Sherwood et al. |
| 5,007,088 A | 4/1991 | Ooi et al. |
| 5,081,675 A | 1/1992 | Kittirutsunetorn |
| 5,748,641 A | 5/1998 | Ohsawa |
| 5,850,452 A | 12/1998 | Sourgen et al. |
| 5,943,283 A | 8/1999 | Wong et al. |
| 6,167,551 A | 12/2000 | Nguyen et al. |
| 6,222,924 B1 | 4/2001 | Salomaki |
| 6,459,792 B2 * | 10/2002 | Ohmori et al. ............... 380/37 |
| 6,549,468 B2 | 4/2003 | Zitlaw et al. |
| 6,601,205 B1 | 7/2003 | Lehmann et al. |
| 7,197,594 B2 | 3/2007 | Raz et al. |
| 7,412,057 B2 | 8/2008 | Dagan et al. |
| 2002/0003675 A1 | 1/2002 | Tomiyama et al. |
| 2004/0060060 A1 * | 3/2004 | Carr ............................... 725/31 |
| 2004/0128458 A1 | 7/2004 | Buhr |
| 2004/0136530 A1 * | 7/2004 | Endo et al. ................... 380/44 |
| 2006/0107072 A1 | 5/2006 | Umezu et al. |
| 2007/0016799 A1 | 1/2007 | Klint et al. |
| 2007/0211734 A1 * | 9/2007 | Yang et al. ................... 370/401 |
| 2007/0258582 A1 | 11/2007 | Elder et al. |
| 2008/0140910 A1 * | 6/2008 | Flynn et al. .................. 711/100 |
| 2008/0152142 A1 | 6/2008 | Buer et al. |
| 2008/0170685 A1 | 7/2008 | Flake et al. |
| 2008/0267399 A1 * | 10/2008 | Medvinsky et al. .......... 380/201 |
| 2009/0086972 A1 | 4/2009 | Mozak |
| 2010/0197236 A1 * | 8/2010 | Kawamura ................... 455/67.7 |
| 2010/0325695 A1 * | 12/2010 | Suzuki ............................. 726/3 |

* cited by examiner

*Primary Examiner* — Kaveh Abrishamkar
*Assistant Examiner* — Adrian Stoica (57) ABSTRACT

Data storage devices having one or more data security features are provided according to various embodiments of the present invention. In one embodiment, a data storage device comprises buffer and a buffer client. The buffer client comprises a scrambler configured to receive a configuration setting and a secret key on a certain event, to configure a scrambling function based on the received configuration setting, and to scramble data with the secret key using the scrambling function, wherein the buffer client is configured to write the scrambled data to the buffer.

19 Claims, 6 Drawing Sheets

MEMORY PROTECTION

BACKGROUND OF THE INVENTION

Data storage devices are commonly used to store data in computers, data bases, digital video recorders and other devices. A data storage device may include a storage media for storing data, such as a hard disk, solid state memory or other type of memory. Typically, a data storage device includes a buffer for temporarily storing data to be written to the storage media, data read from the storage media and/or data being processed by the data storage device. The buffer may include dynamic random access memory (DRAM) or other type of memory. A data storage device may be used to store sensitive data that is vulnerable to unauthorized access and other security threats while temporarily stored in the buffer of the data storage device.

Accordingly, there is a need to provide data security for data temporarily stored in a data storage device.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
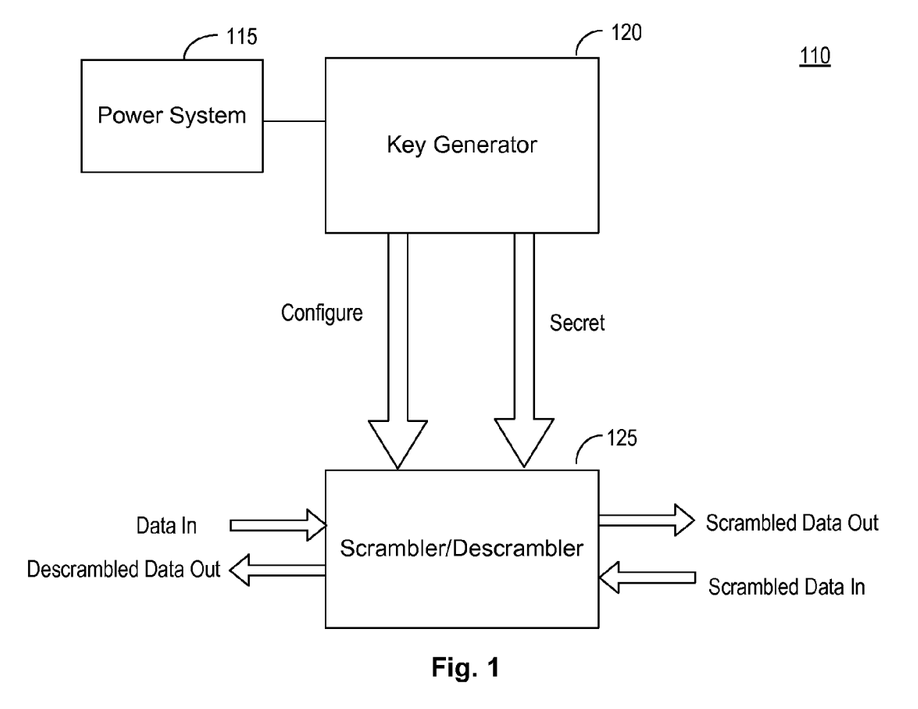
FIG. 1 is a block diagram of a data security system according to an embodiment of the present invention.

FIG. 1 shows a data security system 110 according to an embodiment of the present invention. The data security system 110 may be used to protect data temporarily stored in a buffer from security threats, as discussed further below.

The data security system 110 includes a power system 115, a key generator 120 and a scrambler/descrambler 125. The power system 115 provides power to the key generator 120 and the scrambler/descrambler 125. The key generator 120 generates a secret key when certain events occur. For example, the key generator 120 may generate a secret key on each power cycle of the power system 115, which may correspond to one cycle of the power system 115 powering on and off. In another example, the key generator 120 may generate a secret key when a buffer (e.g., DRAM) is flushed to a storage media (e.g., hard disk or solid state memory). The key generator 120 may generate the secret key using a random sequence generator so that the secret key changes for each power cycle or other event. The key generator 120 may transmit the secret key to the scrambler/descrambler 125 on each power cycle or other event.

Figure 4:
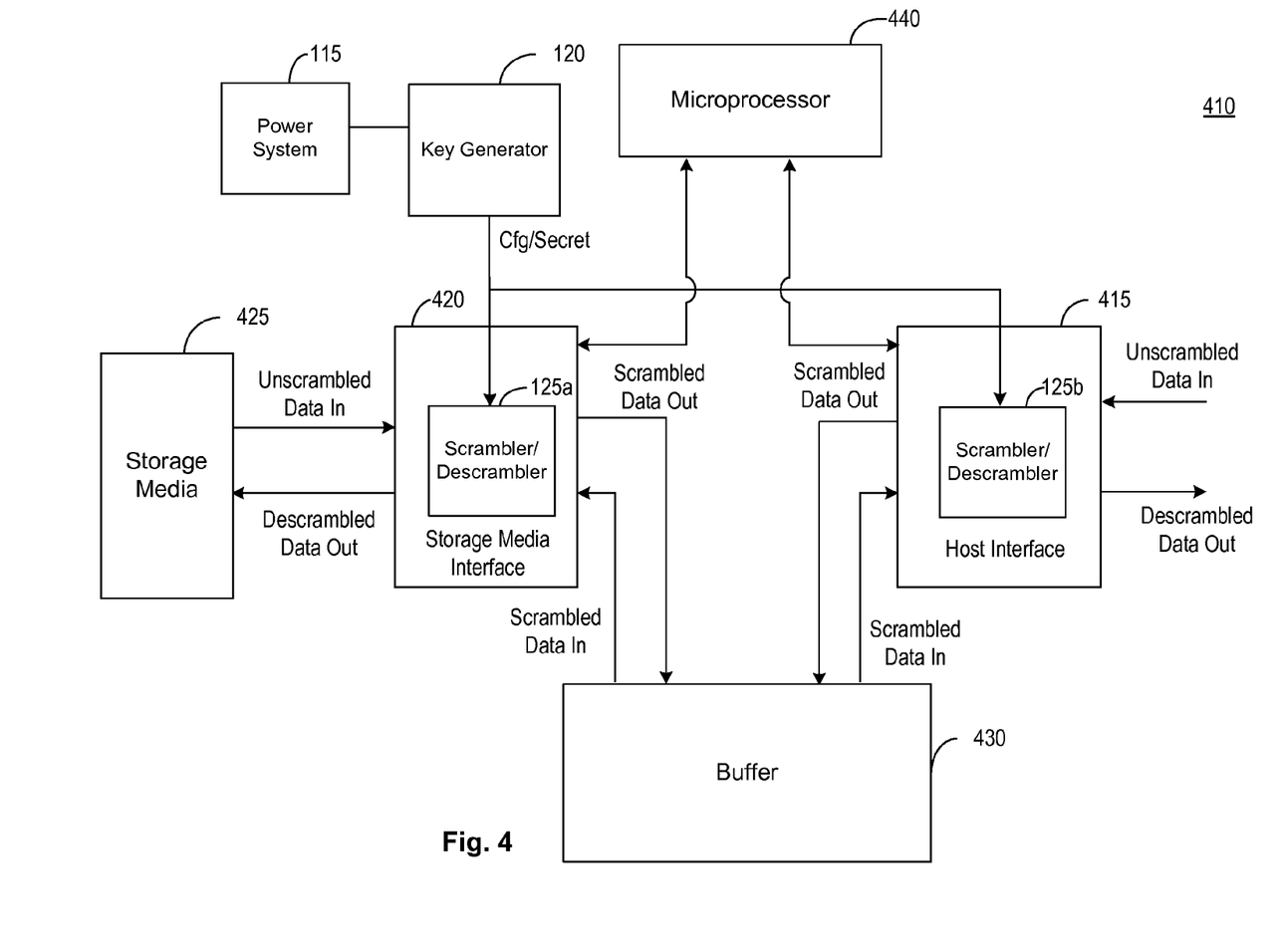
FIG. 4 is a block diagram of a data storage device according to an embodiment of the present invention.

The scrambler/descrambler 125 receives the secret key from the key generator 120 on each power cycle or other event and uses the secret key to scramble incoming data into scrambled data. In one embodiment, the scrambler/descrambler 125 scrambles the data by XORing the data with the secret key. After scrambling, the scrambled data may be temporarily stored in a buffer, an example of which is shown in FIG. 4.

The scrambler/descrambler 125 may also descramble scrambled data using the same secret key used to scramble the data. Since a particular secret key may persist for one power cycle for the embodiment in which the secret key changes on each power cycle, the scrambling/descrambler 125 can descramble scrambled data generated during the same power cycle. The scrambler/descrambler 125 may retrieve the scrambled data from the buffer and descramble the retrieved data. Thus, the scrambler/descrambler 125 can be used to provide security for data while the data is stored in the buffer by scrambling the data as the data is written to the buffer and descrambling the data as the data is read out of the buffer.

In one embodiment, the scrambler/descrambler 125 may also reorder incoming data for added security. In this embodiment, the data may be divided into data words (e.g., 32-bit data words) and the scrambler/descrambler 125 may include a plurality of reordering schemes, where each reordering scheme specifies a reordering or repositioning of bits and/or bytes within each data word. Each reordering scheme may correspond to a configuration setting of the scrambler/descrambler 125.

In one embodiment, the key generator 120 may randomly select a configuration setting, and hence a reordering scheme, when certain events occur. For example, the key generator 120 may select a configuration setting on each power cycle. In another example, the key generator 120 may select a configuration setting when a buffer is flushed to a storage media. The key generator 120 transmits the selected configuration setting to the scrambler/descrambler 125. Upon receiving the configuration setting, the scrambler/descrambler 125 may reorder incoming data based on the corresponding reordering scheme. The scrambler/descrambler 125 may reorder the data before and/or after the data is scrambled with the secret key.

When the scrambler/descrambler 125 descrambles scrambled data, the scrambler/descrambler 125 may undo the reordering of the scrambled data by reversing the reordering scheme used to reorder the data. For the embodiment where the configuration setting persists for one power cycle, the scrambler/descrambler 125 can undo data reordering for data reordered during the same power cycle.

The scrambler/descrambler 125 may be implemented using one or more processors for executing instructions and may further include memory, such as a volatile or non-volatile memory, for storing data (e.g., data being processed) and/or instructions. The instructions may be executed by the one or more processors to perform the various functions of the scrambler/descrambler 125 described in the disclosure. The one or more processors may include a microcontroller, a Digital Signal Processor (DSP), an Application Specific Integrated Circuit (ASIC), a Field Programmable Gate Array (FPGA), hard-wired logic, analog circuitry and/or a combination thereof.

Figure 2A:
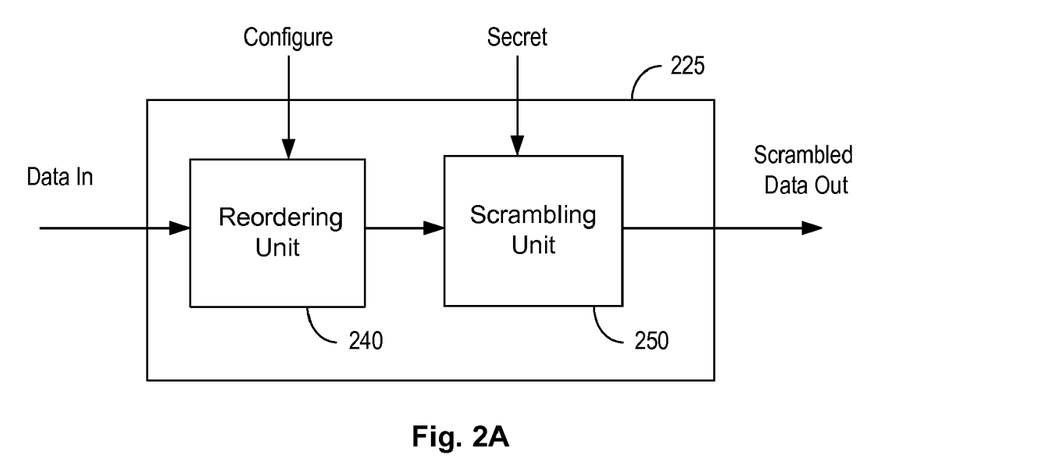
FIG. 2A is a block diagram of a scrambler according to an embodiment of the present invention.

FIG. 2A shows a scrambler 225 according to an embodiment of the present invention. The scrambler 225 may be part of the scrambler/descrambler 125 shown in FIG. 1. The scrambler 225 comprises a reordering unit 240 and a scrambling unit 250. The reordering unit 240 is configured to reorder incoming data and the scrambling unit 250 is configured to scramble the incoming data with the secret key from the key generator 120.

In one embodiment, the data may be divided into data words, where each data word comprises a plurality of bytes (e.g., four bytes). In this embodiment, the reordering unit 240 may reorder the bytes within each data word according to a reordering scheme corresponding to a particular configuration setting of the scrambler 225. The reordering unit 240 may include a plurality of different reordering schemes, where each reordering scheme specifies a specific reordering or repositioning of bytes within each data word and each reordering scheme corresponds to a particular configuration setting of the scrambler 225. For example, one of the reordering schemes may shift the order of the bytes within a data word such that the first byte of the data word becomes the last byte of the reordered data word, the second byte of the data word becomes the first byte of the reordered data word, the third byte of the data word becomes the second byte of the reordered data word, and so forth. The reordering unit 240 may include any number of reordering schemes.

In one embodiment, the key generator 120 randomly selects a configuration setting for the scrambler 225 on each power cycle or other event and transmits the selected configuration setting to the scrambler 225. The key generator 120 may randomly select a configuration setting by randomly generating a configuration indicator (e.g., a number) indicating a particular configuration setting and transmitting the configuration indicator to the scrambler 225. Upon receiving the selected configuration setting, the reordering unit 240 reorders incoming data according to the reordering scheme corresponding to the selected configuration setting. Although the reordering unit 240 is shown before the scrambling unit 250, the reordering unit 240 may also be positioned after the scrambling unit 250 for reordering the scrambled data.

The scrambling unit 250 receives the data from the reordering unit 240 and scrambles the data with the secret key. The scrambling unit 250 may scramble the data by XORing the data with the secret key. For example, the secret key may comprise a sequence of bits that is randomly generated by the key generator 120 on each power cycle or other event. In this example, the scrambling unit 250 may scramble the data by performing a bitwise XOR operation, in which each bit of the data is XORed with a bit of the secret key. The scrambling unit 250 may cycle through the bits of the secret key as the scrambling unit 250 XORs incoming data with the secret key. The scrambling unit 250 may also scramble the data with the secret key by performing other logic or encryption operations on the data and the secret key. The resulting scrambled data may be written to a buffer.

Figure 2B:
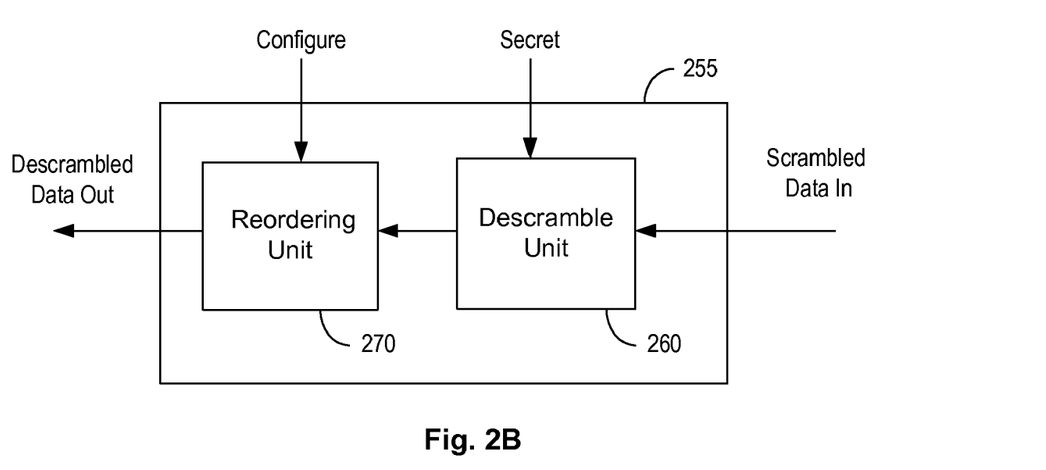
FIG. 2B is a block diagram of a descrambler according to an embodiment of the present invention.

FIG. 2B shows a descrambler 255 according to an embodiment of the present invention. The descrambler 255 may be part of the scrambler/descrambler 125 shown in FIG. 1. The descrambler 255 may descramble data scrambled by the scrambler 225 during the same power cycle. The descrambler 255 comprises a descrambling unit 260 and a reordering unit 270 which reverse the operations performed by the scrambling unit 250 and the reordering unit 240, respectively. The descrambling unit 260 receives the secret key from the key generator 120 and descrambles scrambled data based on the secret key. The reordering unit 270 receives the configuration setting from the key generator 120 and undoes the data reordering by the reordering unit 240. The reordering unit 270 may do this by reversing the reordering scheme used to reorder the data during the same power cycle, where the reordering scheme corresponds to the selected configuration setting.

Figure 3:
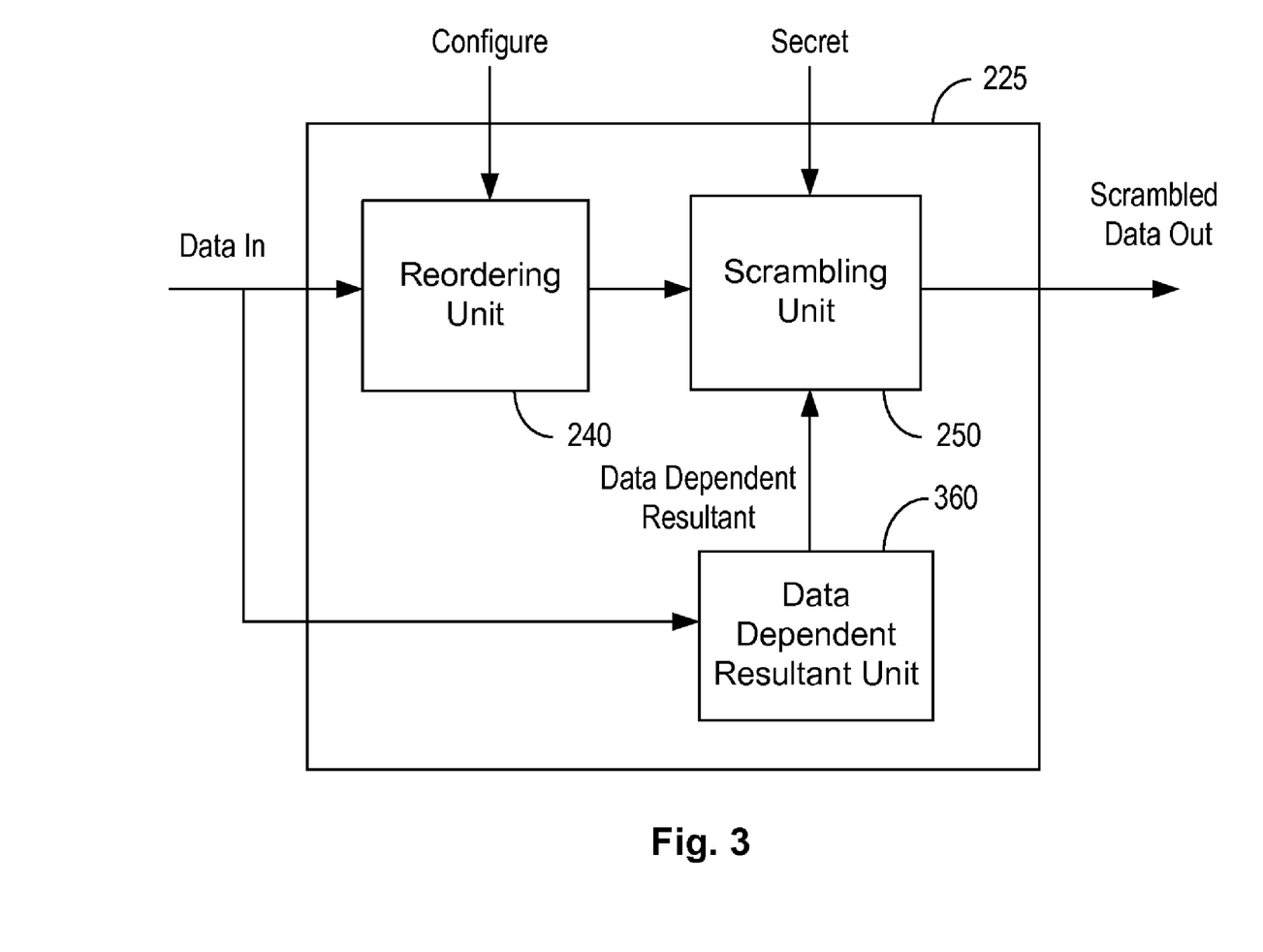
FIG. 3 is a block diagram of a scrambler according to another embodiment of the present invention.

FIG. 3 shows the scrambler 225 according to another embodiment of the present invention. In this embodiment, the scrambler 225 includes a data dependent resultant unit 360 configured to receive the incoming data and perform an operation on the data to generate a data depend resultant having a value dependent on a value of the data. The data dependent resultant unit 360 outputs the data dependent resultant to the scrambling unit 250, which scrambles the data from the reordering unit 240 with both the secret key and the data dependent resultant. The scrambling unit 250 may do this by XORing the secret key with the data dependent resultant and then XORing the result with the data to produce the scrambled data. The data dependent resultant further scrambles the data, resulting in greater data security.

In one embodiment, the data dependent resultant unit 360 may generate the data dependent resultant by performing a checksum algorithm on the incoming data. Checksums are typically used for data integrity, in which a checksum algorithm is applied to a data block to generate a checksum value that is dependent on the value of the data in the data block and a logical block address (LBA) of the data block. The generated checksum is appended to the data block and can later be used to check the validity of the data block. The validity of the data block may be checked by computing a checksum based on the data in the data block and comparing the computed checksum with the checksum in the data block. The checksum algorithm may include an error correction code (ECE) algorithm, a cyclic redundancy check (CRC) algorithm or other error detection/correction algorithm. In this embodiment, the data dependent resultant unit 360 uses the data dependent property of a checksum to generate the data dependent resultant.

In this embodiment, the scrambler 225 may receive a data block one data word (e.g., 32 bits) at a time, where the data block comprises a plurality of data words. For each data word, the data dependent resultant unit 360 may apply the checksum algorithm to the data word to compute a checksum value and add the checksum value to an accumulated checksum value for the data block. The accumulated checksum value is updated for each data word and may be stored in a register in the data dependent resultant unit 360. For each data word, the data dependent unit 360 may output the current accumulated checksum value to the scrambling unit 250. The scrambling unit 250 may then scramble the corresponding data word with the secret key and the accumulated checksum value to produce scrambled data. The scrambled data may later be descrambled by the scrambler/descrambler 125 during the same power cycle by reversing the operations of the scrambler 225.

An example of providing data security in a data storage device using the scrambler/descrambler 125 is discussed below with reference to FIG. 4.

FIG. 4 shows a data storage device 410 according to an embodiment of the present invention. The data storage device 410 includes a host interface 415, a buffer 430, a storage media interface 420 and a storage media 425. The storage media 425 may comprise a hard disk, solid state memory (e.g., flash memory) or other storage media. The storage media interface 420 is configured to write data to and read data from the storage media 425. For the example where the storage media 425 comprises a hard disk, the storage media interface 420 may include a write/read head for magnetically writing data to and magnetically reading data from the hard disk. The host interface 415 interfaces the data storage device 410 with a host device and may be configured to receive data from the host device to be written to the storage media 425 and to send data read from the storage media 425 to the host device. The buffer 430 may be used to temporarily store data between the host interface 415 and the storage media interface 420, as discussed further below. The buffer 430 may comprise dynamic random access memory (DRAM), RAM and/or other memory. Data in the data storage device 410 may be stored in units of data blocks.

The microprocessor 440 is configured to manage the flow of data among the storage media interface 420, the buffer 430 and the host interface 415. The microprocessor 440 may manage the flow of data to execute read/write commands from the host device. For example, when the host interface 415 receives a read command from the host device, the microprocessor 440 may instruct the storage media interface 420 to read data requested by the read command from the storage media 425 and to store the read data in the buffer 430. The microprocessor 440 may then instruct the host interface 415 to read the data from the buffer 430 and to send the data to the host device.

The data storage device 410 also includes a power system 115 and a key generator 120. The power system 115 may provide power to various components of the data storage device 410. In this example, the power system 115 may undergo a power cycle each time the device is powered on and off.

The storage media interface 420 includes a first scrambler/descrambler 125*a*. The first scrambler/descrambler 125*a* is configured to scramble data retrieved from the storage media 425 and written to the buffer 430, and to descramble scrambled data read from the buffer 430 and written to the storage media 425. Thus, data stored in the buffer is scrambled to provide data security for the data stored in the buffer during one power cycle.

The host interface 425 includes a second scrambler/descrambler 125*b*. The second scrambler/descrambler 125*b* is configured to scramble data received from the host device and written to the buffer 430, and to descramble scrambled data read from the buffer 430 and sent to the host device.

On each power cycle or other event, the key generator 120 may generate a secret key and input the secret key to both the first scrambler/descrambler 125*a* and the second scrambler/descrambler 125*b*. For example, the key generator 120 may randomly generate the secret key on each power cycle. In another example, the key generator 120 may randomly generate the secret key when the buffer 430 is flushed to the storage media 425. The key generator 120 may generate the secret key using a random sequence generator or other technique. The key generator 120 may also select a configuration setting and input the configuration setting to both the first scrambler/descrambler 125*a* and the second scrambler/descrambler 125*b*.

In one embodiment, on each power cycle, the first scrambler/descrambler 125*a* and the second scrambler/descrambler 125*b* receive the same secret key and configuration setting from the key generator 115. This allows the first scrambler/descrambler 125*a* in the storage media interface 420 to descramble data scrambled by the second scrambler/descrambler 125*b* in the host interface 415 during the same power cycle and vise versa. For example, when the second scrambler/descrambler 125*b* in the host interface 415 scrambles data from the host device and writes the scrambled data to the buffer 430, the first scrambler/descrambler 125*a* in the storage media interface 120 can read and descramble the scrambled data from the buffer 430 and store the descrambled data in the storage media (e.g., hard drive). Similarly, when first scrambler/descrambler 125*a* in the storage media interface 420 scrambles data from the storage media 425 and writes the scrambled data to the buffer 430, the second scrambler/descrambler 125*b* in the host interface 415 can read and descramble the scrambled data from the buffer 430 and send the descrambled data to the host device.

Thus, the first scrambler/descrambler 125*a* and the second scrambler/descrambler 125*b* scramble data written to the buffer 430 and descramble data read out of the buffer 430, thereby providing data security for data stored in the buffer 430. Further, in one embodiment, the secret key and the configuration setting used for scrambling and descrambling change on each power cycle, reducing the likelihood that the secret key and configuration setting will be compromised. Further, the secret key and configuration setting can be shielded from the microprocessor 440 since the key generator 120 feeds the secret key and the configuration setting to the first scrambler/descrambler 125*a* and the second scrambler/descrambler 125*b*. This prevents an unauthorized program on the microprocessor 440 from gaining access to the secret key and the configuration setting.

Figure 5:
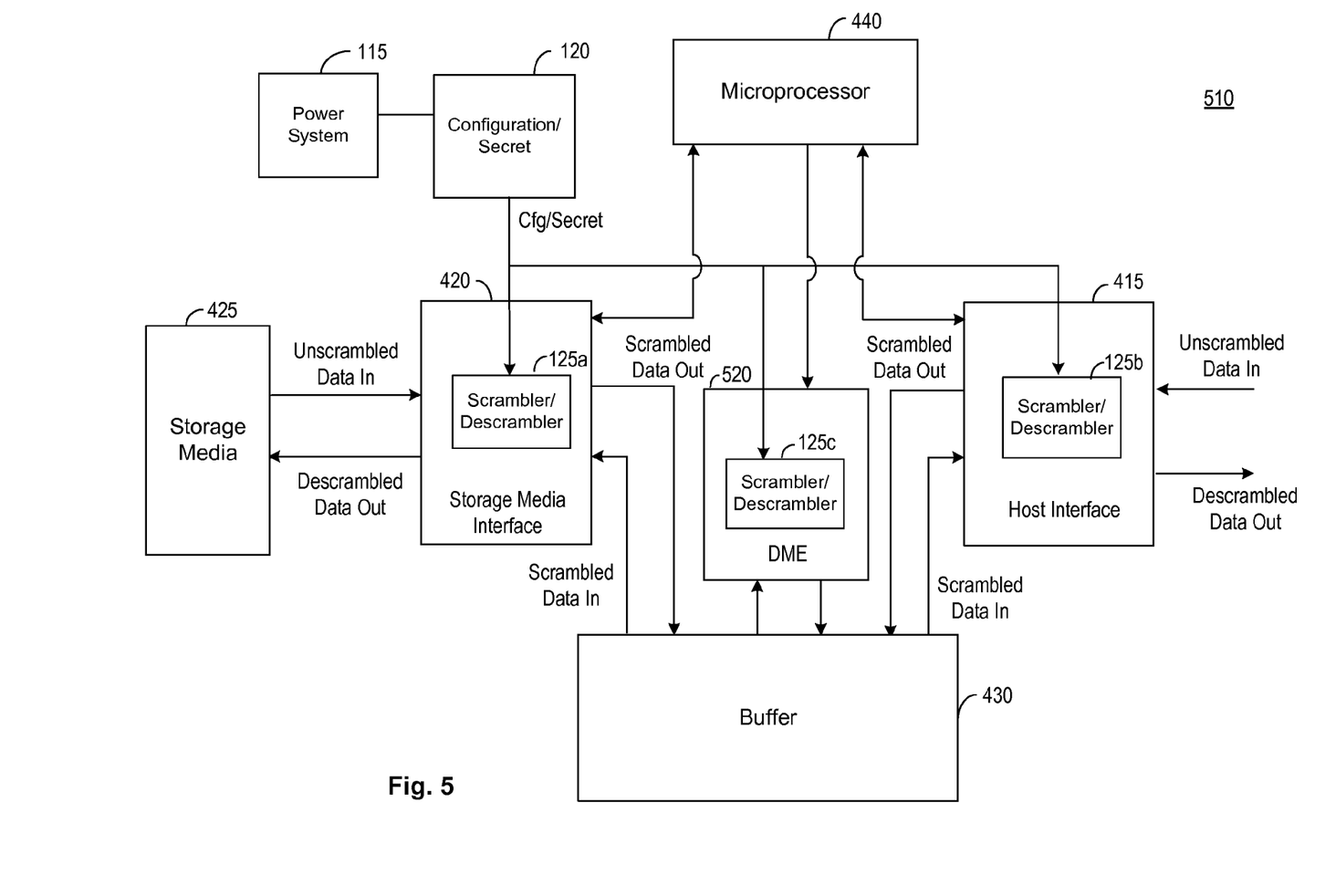
FIG. 5 is a block diagram of a data storage device including a data manipulation engine according to an embodiment of the present invention.

FIG. 5 shows the data storage device 510 according to another embodiment of the present invention. In this embodiment, the data storage device 510 includes a data manipulation engine 520, which may be configured to perform data manipulation operations (e.g., logic operations), data movement operations and/or data protection operations on data within the data storage device 510, as discussed further below. In one embodiment, the data manipulation engine 520 may perform a logic operation (OR, XOR and/or AND operation) on two data blocks from the buffer 430 resulting in a new data block, and write the new data block to the buffer 430. In this example, the two data blocks are the operands of the logic operation and the new data block is the resultant of the logic operation.

In one embodiment, the data manipulation engine 520 includes a third scrambler/descrambler 125*c* configured to descramble data blocks from the buffer 430 before a logic operation is performed on the data blocks and to scramble the resultant new data block from the logic operation. On each power cycle or other event, the third scrambler/descrambler 125*c* may receive the same secret key and configuration setting from the key generator 120 as the first scrambler/descrambler 125*a* and the second scrambler 125*b*. This allows each scrambler/descrambler 125*a*, 125*b* and 125*c* to descramble data scrambled by another one of the scrambler/descrambler 125*a*, 125*b* and 125*c* during the same power cycle.

The microprocessor 440 may also issue commands to the data manipulation engine 520 to perform a specific data manipulation operation (e.g., OR, XOR and/or AND operation) and/or other operation on data stored in the buffer 430. For example, the microprocessor 440 may issue a command instructing the data manipulation engine 520 to retrieve two data blocks from two different source addresses in the buffer 430, to perform a specified operation (e.g., OX, XOR and/or AND operation) on the two data blocks, and to store the resulting new data block to a destination address in the buffer 430. The third scrambler/descrambler 125*c* in the data manipulation engine 520 descrambles the two retrieved data blocks before the data manipulation operation is performed on the two data blocks and scrambles the resultant new data block before the resultant new data block is stored in the buffer 430.

Additional details on data manipulation engines can be found in U.S. patent application Ser. No. 12/611,078 entitled "Data Manipulation Engine," filed on Nov. 2, 2009, the entire specification of which is incorporated herein by reference.

The host interface 415, the storage media 420 and the data manipulation engine 520 may each be considered a buffer client in the sense that each one can read data from and/or write data to the buffer 430.

Figure 6:
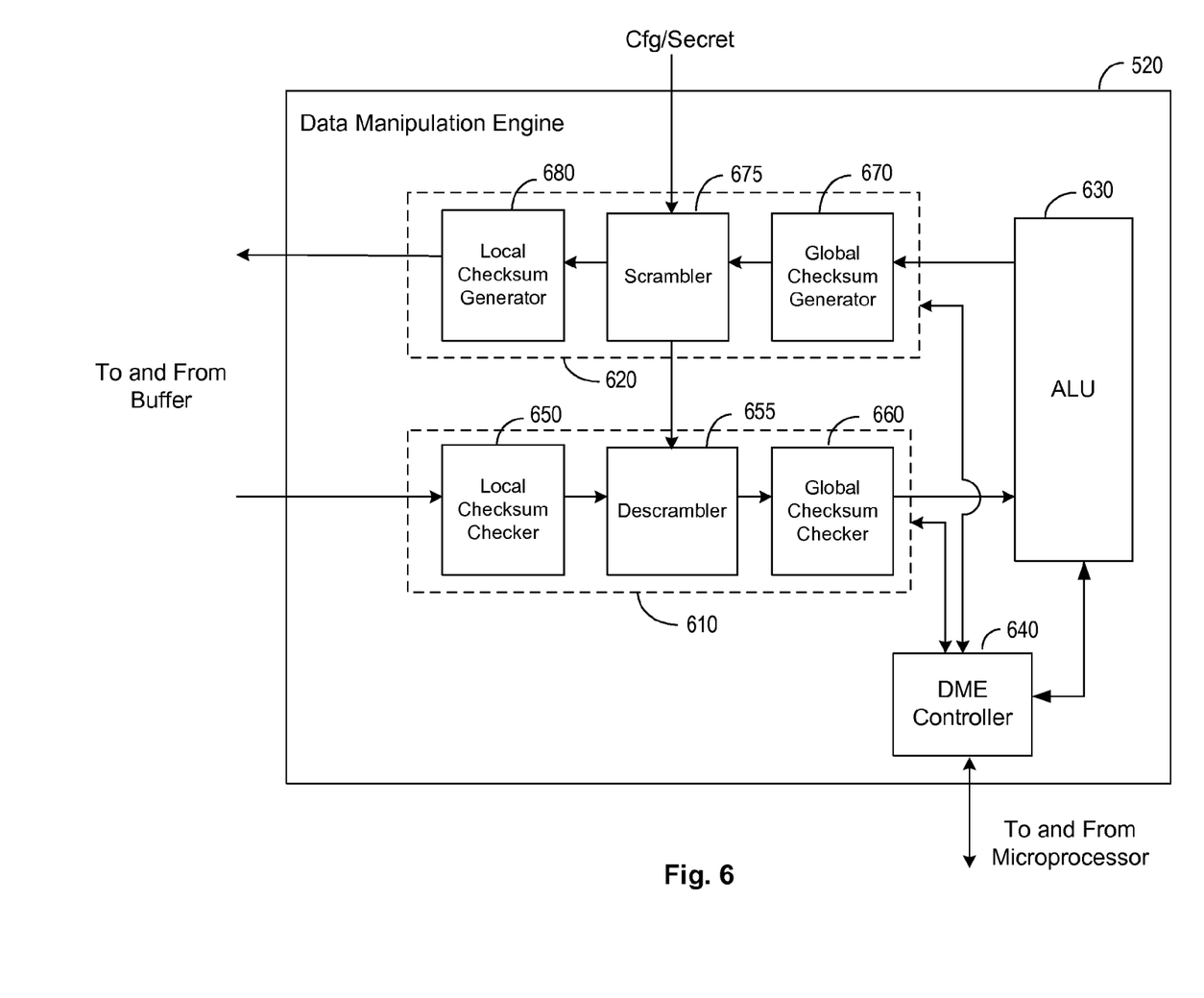
FIG. 6 is a block diagram of a data manipulation engine according to an embodiment of the present invention.

FIG. 6 shows a block diagram of the data manipulation engine 520 according to an embodiment of the present invention. The data manipulation engine 520 includes a receive pipe 610, an arithmetic logic unit (ALU) 630, a transmit pipe 620, and a data manipulation engine (DME) controller 640. The DME controller 640 is configured to receive a command from the microprocessor 440 and control the receive pipe 610, the (ALU) 630 and the transmit pipe 620 to execute the command, as discussed further below.

In an embodiment, the receive pipe 610 is configured to retrieve data blocks from the buffer 630 at locations specified by the DME controller 640, and to check the validity of data blocks using global checksums and/or local checksums of the data blocks. The receive pipe 610 also descrambles the data blocks and forwards the descrambled data blocks to the ALU 630.

The ALU 630 is configured perform a logic operation (e.g., OR, XOR and/or AND operation) specified by the DME controller 640 on one or more data blocks. The ALU 630 may also perform other operations, including a COPY operation, a VERIFY operation, and/or a FILL operation. The ALU 630 outputs a data block resulting from the operation to the transmit pipe 620. For example, when the ALU 630 performs a logic operation (e.g., OR, XOR and/or AND operation) on two descrambled data blocks from the receive pipe 610, the ALU 630 may output a new data block resulting from the logic operation to the transmit pipe 620. In one example, the ALU 630 may perform a bitwise OR, XOR and/or AND operation, in which bits in one of the data blocks are ORed, XORed and/or ANDed with corresponding bits in the other data block.

The transmit pipe 620 may generate a local checksum and/or global checksum for the new data block outputted from the ALU 630, scramble the new data block, and write the scrambled data block to the buffer 430.

In one embodiment, a command received by the DME controller 640 from the microprocessor 440 may include first and second source addresses identifying the locations of first and second data blocks, respectively, in the buffer 430. The command may also include a logic operation (e.g., OR, XOR and/or AND operation) to be performed on the two data blocks. The command may further include a destination address identifying a location in the buffer 430 at which the scrambled new data block is to be stored.

In one embodiment, the receive pipe 610 includes a local checksum checker 650, a descrambler 655, and a global checksum checker 660. The transmit pipe 620 includes a global checksum generator 670, a scrambler 675, and a local checksum generator 680. The descrambler 655 and the scrambler 675 may be part of the third scrambler/descrambler 125c shown in FIG. 5.

The local checksum checker 650 is configured to retrieve a data block from a source address in the buffer 430 based on an instruction from the DME controller 640 and check the validity of the scrambled data in the data block. If the data block is invalid, then the local checksum checker 650 may send a signal to the DME controller 640 indicating that the data block is invalid. In one embodiment, the host interface 415 and/or the storage media interface 420 may generate and append a local checksum to a scrambled data block and the local checksum checker 650 may later use the local checksum to check the validity of the scrambled data block. The local checksum may be used to provide local data integrity within the data storage device. For example, a scrambled data block may become invalid when the scrambled data block is corrupted in the buffer 430.

The descrambler 655 is configured to descramble the data block. In one embodiment, the descrambler 655 may descramble the data block using the secret key from the key generator 120. The global checksum checker is 660 is configured to check the validity of the descrambled data in the data block using the global checksum. In one embodiment, a host device or other device which sent the data block to the data storage device 410 may generate and append a global checksum to the data block before the data block is scrambled by the host interface 415 and/or storage media interface 420. The global checksum checker 660 may use the global checksum of a descrambled data block to check the validity of the descrambled data block. The global checksum checker 660 may then forward the descrambled data block to the ALU 630.

The ALU 630 may receive two descrambled data blocks from the receive pipe 610 and perform a logic operation (e.g., XOR, OR and/or AND operation) on the descrambled data blocks. The ALU may then output a new data block resulting from the logic operation to the global checksum generator 670.

The global checksum generator 670 is configured to generate a global checksum for the new data block outputted by the ALU 630 and append the generated global checksum to the new data block. The scrambler 675 is configured to scramble the new data block from the global checksum generator 675 to produce a scrambled data block. The scrambler 675 may scramble the new data block using the secret key from the key generator 120. For the embodiment in which the scrambler 675 includes the data dependent resultant unit 360 shown in FIG. 3, the data dependent resultant unit 360 may use an accumulated checksum value in the global checksum generator 670 for the data dependent resultant.

The local checksum generator 680 is configured to generate a local checksum for the scrambled data block from the scrambler 675 and append the generated local checksum to the scrambled data block. The local checksum generator 680 may then write the scrambled data block to a destination address in the buffer 430 based on an instruction from the DME controller 640.

The descrambler 655 and the scrambler 675 allow the data manipulation engine 520 to descramble scrambled data blocks to perform logic operations on the data blocks while preserving the security of the data blocks. This is because the scrambled data blocks are descrambled within the data manipulation engine 520 and the resulting new data block is scrambled within the data manipulation engine 520. As a result, the unscrambled data remains inside the data manipulation engine 520 and therefore shielded from the microprocessor 440 and/or other parts of the data storage device 410.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A data storage device, comprising:
   a buffer; and
   a buffer client, the buffer client comprising:
   a scrambler configured to receive a configuration setting and a secret key on a certain event, to configure a scrambling function based on the received configuration setting, and to scramble data with the secret key using the scrambling function, wherein the event is a power cycle of the data storage device, and the secret key changes for each power cycle of the data storage device;
   a descrambler; and
   an arithmetic unit,
   wherein:
   the buffer client is configured to write the scrambled data to the buffer, to read scrambled data from the buffer, and to read first and second scrambled data blocks from the buffer,
   the descrambler is configured to descramble the read scrambled data, and to descramble the first and second scrambled data blocks,
   the arithmetic unit is configured to perform a logic operation on the descrambled first and second data blocks to produce a third data block,
   the scrambler is configured to scramble the third data block, and
   the buffer client is configured to write the scrambled third data block to the buffer.

2. The data storage device of claim 1, wherein the scrambler is configured to generate a data dependent resultant having a value dependent on a value of the data and to scramble the data with the secret key and the data dependent resultant.

3. The data storage device of claim 2, wherein the scrambler is configured to generate the data dependent resultant by applying a checksum algorithm to the data.

4. The data storage device of claim 1, wherein the scrambler is configured to select one of a plurality of reordering schemes based on the configuration setting and to reorder the data based on the selected reordering scheme.

5. The data storage device of claim 4, wherein the data comprises a plurality of bytes and the scrambler is configured to reorder the bytes of the data based on the selected reordering scheme.

6. The data storage device of claim 1, wherein the buffer client comprises a storage media interface, wherein the storage media interface is configured to read data from a storage media, the scrambler is configured to scramble the read data, and the storage media interface is configured to write the scrambled read data to the buffer.

7. The data storage device of claim 6, wherein the storage media comprises a hard disk.

8. The data storage device of claim 6, wherein the storage media comprises solid state memory.

9. The data storage device of claim 1, wherein the buffer client comprises a host device interface, wherein the host device interface is configured to receive data from a host device, the scrambler is configured to scramble the received data, and the host device interface is configured to write the scrambled received data to the buffer.

10. The data storage device of claim 1, wherein the buffer client comprises a checksum checker configured to check the validity of the descrambled first and second data blocks based on checksums in the descrambled first and second data blocks, respectively.

11. The data storage device of claim 10, wherein the buffer client comprises a checksum generator configured to generate a checksum based on user data in the third data block and to append the generated checksum to the third data block before the scrambler scrambles the third data block.

12. A method for providing data security in a data storage device, comprising:
   receiving a configuration setting and a secret key on a certain event, wherein the event is a power cycle of the data storage device;
   configuring a scrambling function based on the configuration setting;
   scrambling data with the secret key using the scrambling function;
   writing the scrambled data to a buffer;
   changing the secret key for each power cycle of the data storage device;
   reading first and second scrambled data blocks from the buffer;
   descrambling the first and second scrambled data blocks;
   performing a logic operation on the descrambled first and second data blocks to produce a third data block;
   scrambling the third data block; and
   writing the scrambled third data block to the buffer.

13. The method of claim 12, further comprising generating a data dependent resultant having a value dependent on a value of the data and wherein the scrambling data with the secret key comprises scrambling the data with the secret key and the data dependent resultant.

14. The method of claim 13, wherein the generating a data dependent resultant comprises applying a checksum algorithm to the data.

15. The method of claim 12, further comprising:
   selecting one of a plurality of reordering schemes based on the configuration setting; and
   reordering the data based on the selected reordering scheme.

16. The method of claim 12, further comprising:
   reading data from a storage media;
   scrambling the read data; and
   writing the scrambled read data to the buffer.

17. The method of claim 16, wherein the storage media comprises a hard disk.

18. The method of claim 16, wherein the storage media comprises solid state memory.

19. The method of claim 12, further comprising:
   receiving data from a host device;
   scrambling the received data; and
   writing the scrambled received data to the buffer.

* * * * *